(12) United States Patent  
Desmoulins et al.

(10) Patent No.: US 12,548,969 B2  
(45) Date of Patent: Feb. 10, 2026

(54) OPTICAL AMPLIFIER WITH TWO SEED SOURCE LASERS CONTROLLED TO REDUCE STIMULATED BRILLOUIN SCATTERING

(71) Applicant: SPI LASERS UK LIMITED, Southampton (GB)

(72) Inventors: Sebastien Georges Desmoulins, Southampton (GB); Michael Kevan Durkin, Southampton (GB)

(73) Assignee: Trumpf Laser UK Limited, Hedge End (GB)

( * ) Notice: Subject to any disclaimer, the term of this patent is extended or adjusted under 35 U.S.C. 154(b) by 1192 days.

(21) Appl. No.: 17/436,858

(22) PCT Filed: Mar. 11, 2020

(86) PCT No.: PCT/GB2020/000028  
§ 371 (c)(1),  
(2) Date: Sep. 7, 2021

(87) PCT Pub. No.: WO2020/188232  
PCT Pub. Date: Sep. 24, 2020

(65) Prior Publication Data  
US 2022/0166181 A1 May 26, 2022

(30) Foreign Application Priority Data  
Mar. 15, 2019 (GB) ..................................... 1903633

(51) Int. Cl.  
*H01S 3/13* (2006.01)  
*H01S 3/067* (2006.01)  
*H01S 3/0933* (2006.01)  
*H01S 3/0941* (2006.01)  
(Continued)

(52) U.S. Cl.  
CPC ...... *H01S 3/13013* (2019.08); *H01S 3/06779* (2013.01); *H01S 3/0933* (2013.01); *H01S 3/09415* (2013.01); *H01S 3/1001* (2019.08); *H01S 3/10015* (2013.01);  
(Continued)

(58) Field of Classification Search  
None  
See application file for complete search history.

(56) References Cited

U.S. PATENT DOCUMENTS 6,459,829 B1 * 10/2002 Yamauchi ............ H04B 10/506  
385/11  
6,522,796 B1 * 2/2003 Ziari ...................... G02B 6/272  
385/11  
6,760,151 B1 7/2004 Vail et al.  
(Continued)

FOREIGN PATENT DOCUMENTS

WO 2005013445 A1 2/2005

*Primary Examiner* — Eric L Bolda  
(74) *Attorney, Agent, or Firm* — Iandiorio Teska & Coleman, LLP

(57) ABSTRACT

Apparatus for providing optical radiation (9), which apparatus comprises; a first seed source (1) for providing first seeding radiation (11); a second seed source (2) for providing second seeding radiation (12); a coupler (3) connected to the first seed source (1) and the second seed source (2) for coupling the first seeding radiation (11) and the second seeding radiation (12) together; and at least one amplifier (4) for amplifying the first seeding radiation (11) and the second seeding radiation (12).

16 Claims, 5 Drawing Sheets

(51) Int. Cl.
  *H01S 3/10* (2006.01)
  *H01S 3/094* (2006.01)
(52) U.S. Cl.
  CPC ...... *H01S 3/10023* (2013.01); *H01S 3/10061* (2013.01); *H01S 3/094003* (2013.01)

(56) References Cited

U.S. PATENT DOCUMENTS

| | | |
|---|---|---|
| 7,764,720 B1 | 7/2010 | Bronder et al. |
| 8,462,426 B1 | 6/2013 | Dajani et al. |
| 2004/0213302 A1* | 10/2004 | Fermann ............... H01S 3/0014 372/6 |
| 2005/0220458 A1 | 10/2005 | Kupershmidt et al. |
| 2009/0009855 A1* | 1/2009 | Nakatsuka ............... H01S 3/16 359/343 |
| 2009/0092400 A1 | 4/2009 | Igarashi et al. |
| 2009/0323741 A1 | 12/2009 | Deladurantaye et al. |
| 2011/0019705 A1* | 1/2011 | Adams ................ H01S 3/13013 359/341.1 |
| 2011/0142084 A1* | 6/2011 | Reid ..................... H01S 5/4006 372/20 |
| 2011/0216790 A1 | 9/2011 | Durkin et al. |
| 2011/0267671 A1* | 11/2011 | Peng ....................... H01S 3/005 359/341.1 |
| 2018/0278010 A1* | 9/2018 | Okada ................... G02F 1/3551 |

\* cited by examiner

OPTICAL AMPLIFIER WITH TWO SEED SOURCE LASERS CONTROLLED TO REDUCE STIMULATED BRILLOUIN SCATTERING

FIELD OF INVENTION

This invention relates to apparatus for providing optical radiation. The invention has particular application for continuous wave and pulsed lasers including semiconductor diode lasers and fibre lasers, and for marking, cutting, scribing and welding with such lasers. The invention also has application for lasers used for processing highly reflective materials such as copper and diamonds, and for sintering metal powders with lasers in a process commonly referred to as additive manufacturing or 3D printing.

BACKGROUND TO THE INVENTION

Industrial lasers such as fibre lasers and disk lasers have important applications for marking, cutting, scribing, welding, sintering metal powders with lasers in a process commonly referred to as additive manufacturing or 3D printing, and other industrial processing of materials. The lasers are used in many industries including consumer electronics, medical devices, automotive, and aerospace. The lasers can be pulsed or continuous wave. Typical pulse lengths that are achievable range from a few picoseconds through nanoseconds, microseconds and milliseconds. The pulse repetition rate is controlled electronically and can be varied over a wide range.

As power levels and intensities increase, so do problems associated with non-linear effects, for example, spectral noise, temporal noise, speckle, non-linear wavelength conversion of the optical radiation, and self Q-switching. These non-linear effects are undesirable in industrial processing systems where repeatability of a process is required. For example, wavelength conversion causes errors in optical focusing systems and can reduce the optical power able to be delivered to a material, and self Q-switching can destroy optical amplifiers and optical fibres in the laser system.

The local inversion in a fibre amplifier increases considerably before the arrival of a pulse towards the output end of the amplifier. As the pulse propagates, it depletes the inversion and increases its intensity. The amplification process also results in significant pulse reshaping and front-end sharpening. This is extremely important in defining pulse width and peak-power and as a consequence defines the onset of various non-linearities such as stimulated Raman scattering (SRS) and stimulated Brillouin scattering (SBS). Above a certain energy level, all pulses reshape (sharpen) considerably and reduce their pulse width. This is due to the fact that the pulse acquires enough energy to start saturating the amplifier. It is known that under such conditions, energy is extracted primarily by the leading edge of the pulse resulting in pulse reshaping and distortion. Peak power increases nonlinearly with pulse energy and inevitably exceeds the SRS threshold, which is typically around 5 kW to 10 kW, depending upon the fibre design and pulse shape.

Another important effect that limits the output power of pulsed fibre lasers is the formation of giant pulses. These can catastrophically damage the optical components in the system. The effect is believed to be highly dependent upon the peak power and the spectral properties of the laser and believed to arise from stimulated Brillouin scattering (SBS). When the non-linear threshold is reached, forward going pulses are reflected. Giant pulses are observed, and these can catastrophically damage the amplifiers (and other devices) in pulse laser systems. Unfortunately, the effect is stochastic in nature, and by itself very unpredictable. A single variation in the instantaneous spectral properties of a seed source laser (such as a laser diode) which narrows the linewidth can result in an SBS event, and trigger giant pulse formation and subsequent catastrophic damage.

U.S. Pat. No. 7,936,796 discloses a master oscillator power amplifier that uses a multi longitudinal mode Fabry Perot semiconductor laser whose output is amplified by an optical fibre amplifier. A reflector, such as a fibre Bragg grating is inserted between the semiconductor laser and the amplifier. The reflector reduced the bandwidth of the laser radiation emitted from the optical fibre amplifier, and reduced the effects of stimulated Brillouin scattering such as backward traveling random pulses, and the giant pulse formation. This result was surprising because a narrower bandwidth would normally have been expected to make the effects of stimulated Brillouin scattering worse. However, as the required peak powers and average powers continue to increase, stimulated Brillouin scattering, and other non-linear effects have become problematic again.

There is a need for apparatus for providing optical radiation that avoids or reduces the aforementioned problems.

The Invention

According to a non-limiting embodiment of the present invention there is provided apparatus for providing optical radiation, which apparatus comprises;
 a first seed source for providing first seeding radiation;
 a second seed source for providing second seeding radiation;
 a coupler connected to the first seed source and the second seed source for coupling the first seeding radiation and the second seeding radiation together; and
 at least one amplifier for amplifying the first seeding radiation and the second seeding radiation.

The apparatus may comprise a controller for controlling the first seed source, the second seed source, and the amplifier, the apparatus being such that random optical pulses increase in frequency and amplitude if a peak power of the second seeding radiation is reduced.

The apparatus may comprise a controller for controlling the first seed source, the second seed source, and the amplifier, the apparatus being such that the optical radiation emitted by the apparatus has higher peak power, higher average power, and/or higher pulse energy than when the apparatus does not include the second seed source.

The apparatus may comprise a controller for controlling the first seed source, the second seed source, and the amplifier, the apparatus being such that the optical radiation emitted by the apparatus has higher peak power achievable before exceeding a damage threshold of the apparatus than when the apparatus does not include the second seed source.

Surprisingly, it is possible to control the first seed source, the second seed source, and the amplifier such that random optical pulses increase in frequency and amplitude when a peak power of the second seeding radiation is reduced. Such random optical pulses are believed to be indicative of the presence of stimulated Brillouin scattering which can cause catastrophic damage to the apparatus. A reduction in the presence of the random optical pulses and the associated stimulated Brillouin scattering when the peak power of the second seeding radiation is increased allows the apparatus to provide higher peak powers, more reliably.

Also surprisingly, it is possible to control the first seed source, the second seed source, and the amplifier such that optical pulses emitted by the optical amplifier have higher peak powers and higher average powers than for a similar apparatus that does not include the second seed source. The limitation in the peak power achievable is the creation of random optical pulses and giant optical pulses that are believed to be induced by stimulated Brillouin scattering.

The first seeding radiation may be characterized by a first wavelength. The second seeding radiation may be characterized by a second wavelength. The first wavelength may be the same as the second wavelength.

The coupler is preferably a polarization combiner. The apparatus may be configured such that the first seeding radiation and the second seeding radiation are orthogonally polarized.

The apparatus may comprise a depolarizer located between the coupler and the amplifier.

The first seed source may be a Fabry Perot semiconductor laser. The second seed source may be a Fabry Perot semiconductor laser.

The first seed source may be a superluminescent diode. The second seed source may be a superluminescent diode.

The apparatus may comprise a first reflector configured to reflect a proportion of the first seeding radiation into the first seed source. The apparatus may comprise a second reflector configured to reflect a proportion of the second seeding radiation into the second seed source.

The first seed source and the first reflector may be separated by a first distance. The second seed source and the second reflector may be separated by a second distance. The first distance may be the same as the second distance. This enables pulses from the first seed source and the second seed source to overlay if the first seed source and the second seed source are pulsed synchronously. Alternatively, the first distance may be different from the second distance. This enables pulses from the first seed source and the second seed source to be dephased from each other, or interleaved with each other.

The first and the second reflectors may have the same spectral characteristics, or different spectral characteristics.

The spectral characteristics of the first and the second reflectors, and the first and the second distances may be selected to optimize a peak power and a pulse energy of the optical radiation.

The first reflector and the second reflector may be fibre optic Bragg gratings.

The controller may be configured to emit a first control signal to drive the first seed source, and a second control signal to drive the second seed source. The first control signal may be different from the second control signal. Driving the first seed source and the second seed source with different control signals can help ensure that the gain dynamics with the first seed source and the second seed source are different from each other. This can reduce the risk of a stimulated Brillouin scattering event.

The apparatus may comprise a first optical isolator located between the first seed source and the amplifier for isolating the first seed source from backward traveling optical radiation.

The apparatus may comprise a second optical isolator located between the second seed source and the amplifier for isolating the second seed source from backward traveling optical radiation.

The apparatus may comprise a third optical isolator located between the coupler and the amplifier for isolating both the first and second seed sources from backward traveling optical radiation.

The apparatus may include at least one preamplifier and a fourth optical isolator, wherein the fourth optical isolator is located between the preamplifier and the amplifier. The apparatus may comprise a visible laser diode and a coupler, wherein the coupler is configured to combine optical radiation emitted from the visible laser diode and the preamplifier, and to pass the combined optical radiation to the amplifier. The coupler may be incorporated in the fourth optical isolator.

The apparatus may further comprise a beam delivery cable and an output optic, wherein the beam delivery cable comprises an optical fibre for transporting the optical radiation emitted from the amplifier. The optical fibre may be a hollow core fibre. The output optic may comprise an optical isolator.

The invention also provides a method for providing optical radiation, which method comprises:
  providing first seeding radiation from a first seed source;
  providing second seeding radiation from a second seed source;
  coupling the first seeding radiation and the second seeding radiation together with a coupler; and
  amplifying the first seeding radiation and the second seeding radiation with at least one amplifier.

The method of the invention may include a step or steps as required to utilize the above mentioned optional aspects of the apparatus of the invention.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
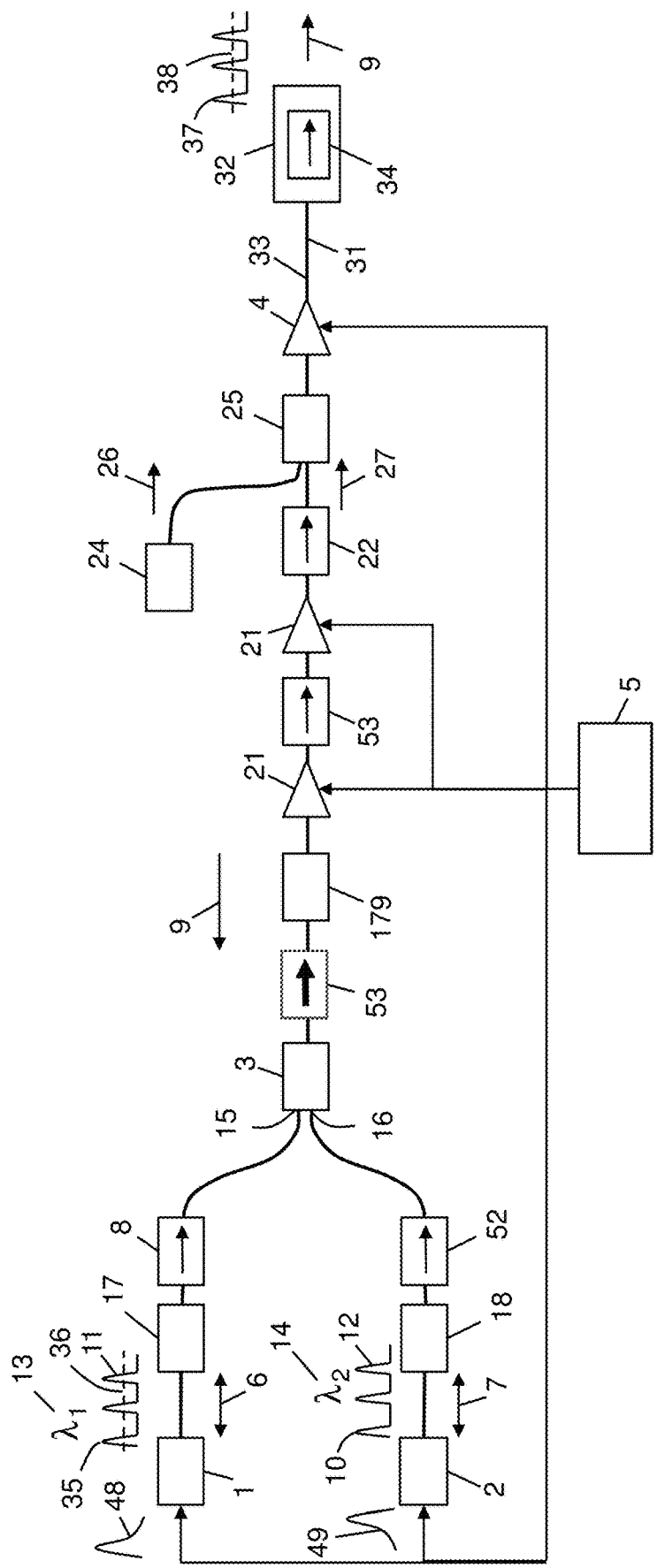
FIG. 1 shows apparatus for providing optical radiation according to the present invention.

FIG. 1 shows apparatus for providing optical radiation 9, which apparatus comprises;
  a first seed source 1 for providing first seeding radiation 11;
  a second seed source 2 for providing second seeding radiation 12;
  a coupler 3 connected to the first seed source 1 and the second seed source 2 for coupling the first seeding radiation 11 and the second seeding radiation 12 together; and
  at least one amplifier 4 for amplifying the first seeding radiation 11 and the second seeding radiation 12.

The apparatus may comprise a controller 5 for controlling the first seed source 1, the second seed source 2, and the amplifier 4.

The controller 5 may control the first seed source 1, the second seed source 2, and the amplifier 4 such that a peak power 35 of the first seeding radiation 11 is greater than a threshold peak power 36 that results in stimulated Brillouin scattering of sufficient intensity to damage the apparatus when there is no second seeding radiation 12 emitted by the second seed source 2 thus enabling a peak power 37 of the optical radiation 9 emitted by the apparatus to be increased.

The controller 5 may control the first seed source 1, the second seed source 2, and the amplifier 4 such that the peak power 37 of the optical radiation 9 is greater than a damage threshold 38 when there is no second seeding radiation 12 emitted by the second seed source 2.

The controller 5 may be configured to cause the first seed source 1 and the second seed source 2 to emit optical pulses as shown in FIG. 1. Alternatively or additionally, the controller 5 may be configured to cause the first seed source 1 and the second seed source 2 to emit continuous wave optical radiation.

Figure 2:
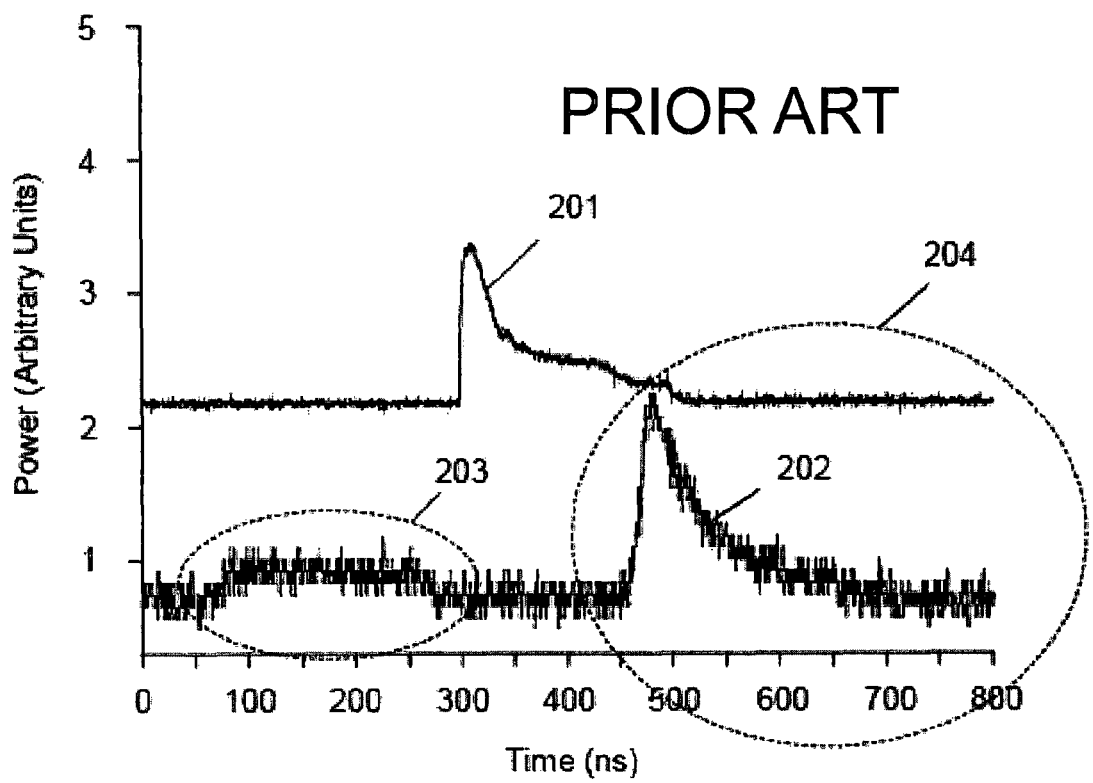
FIG. 2 shows prior art examples of forward going pulses.

As described in U.S. Pat. No. 7,936,796, FIG. 2 shows the optical power 201 of a forward going pulse that travels from the first seed source 1 through the amplifier 4. The output power 201 was measured at the output of the amplifier 4. FIG. 2 also shows the output power 202 of a backward traveling pulse that travels towards the first seed source 1 in normal operation. The measurements were taken in a similar apparatus to that shown in FIG. 1, though with only the first seed source laser 1 present. The optical powers 201 and 202 are plotted on different scales since the output power 201 has a much higher power than the optical power 202. The output power 202 comprises a first reflection 203 and a second reflection 204 that originate from different splices in the apparatus. The pulse shapes as shown in FIG. 2 are typical of the vast majority of pulses emerging in apparatus such as shown in FIG. 1.

Figure 3:
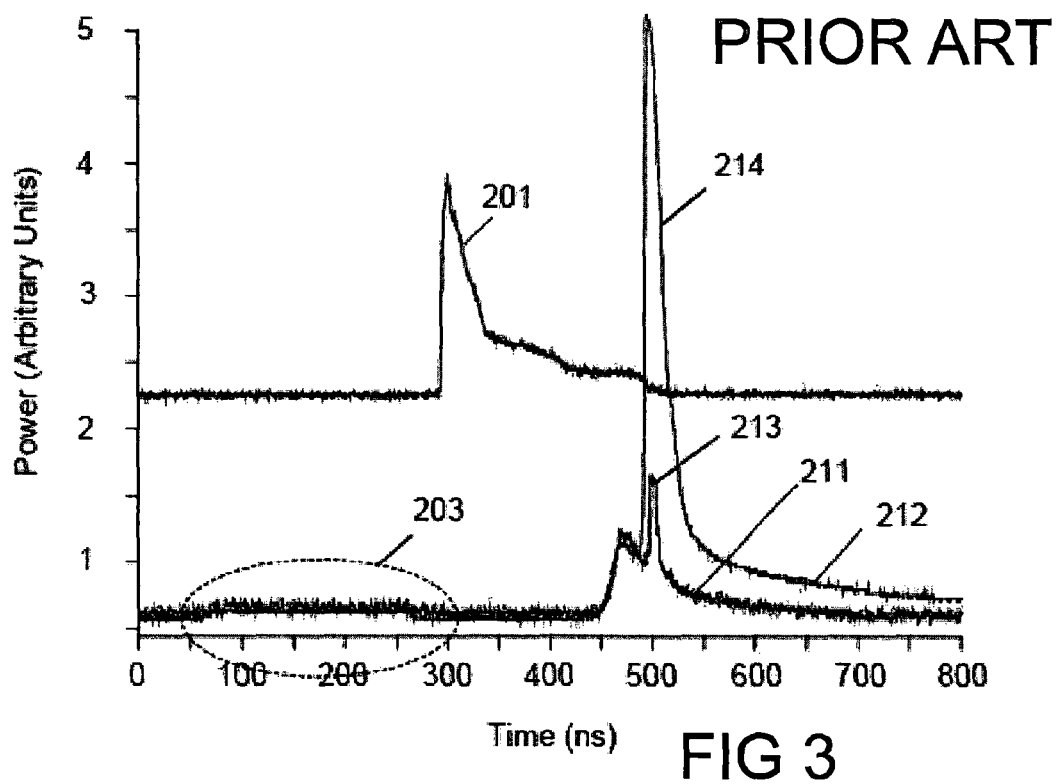
FIG. 3 shows prior art optical pulses containing additional spikes.

FIG. 3 shows two examples of backward traveling pulses 211, 212 that propagate towards the first seed source 1. The pulses 211 and 212 comprise the optical powers 203 and 204 as before, but also contain additional spikes 213 and 214. These additional spikes 213 and 214 occur infrequently and are random in both occurrence and in magnitude. The frequency of occurrence can be varied by changing the operating conditions of the first seed source 1 (such as temperature, drive current and pulse shape). At a pulse repetition frequency of 25 kHz, the additional spikes have been observed at a rate of between approximately one measured over a forty-eight-hour period through to 30,000 measured over a five minute period. Additionally, the rate of occurrence can be varied by using different first seed sources 1 supplied by different or the same manufacturer. Although additional spikes 213, 214 were observed in the backward traveling direction, no evidence is observable in the forward going pulse shape 201. It is believed that the spikes 213 and 214 are evidence of stimulated Brillouin scattering (SBS). The spikes 213 and 214 are random in nature, are generally undesirable, and are referred to elsewhere herein as random pulses.

Figure 4:
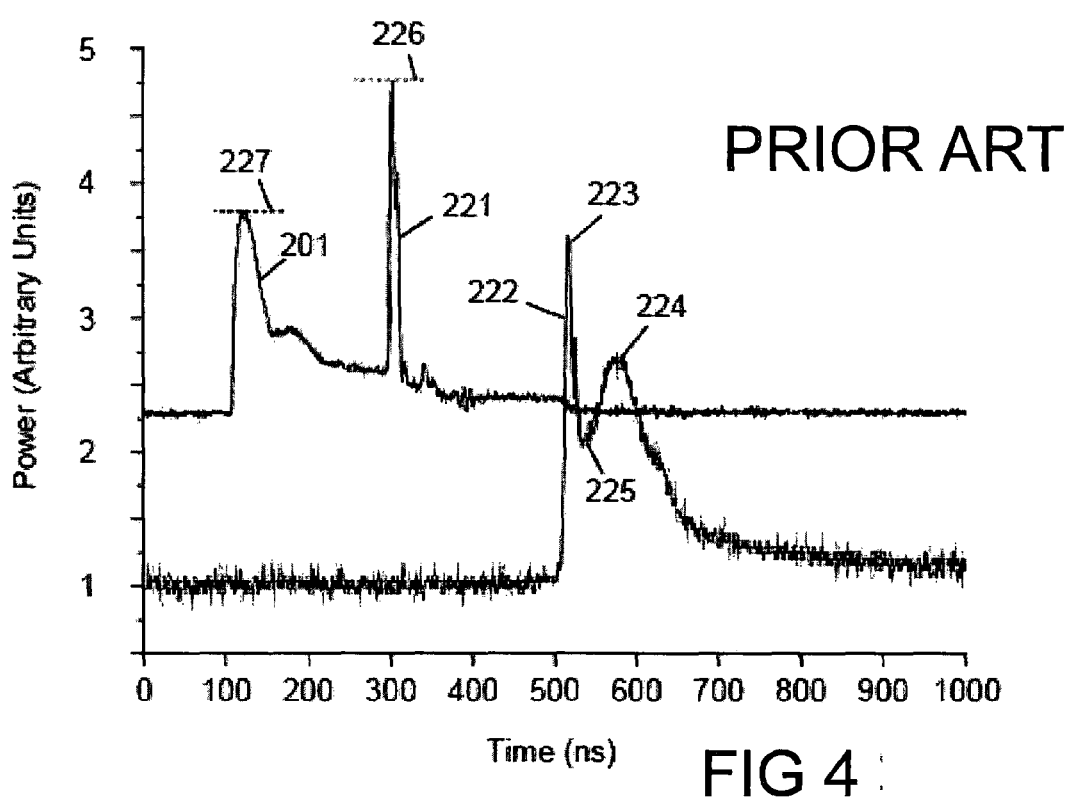
FIG. 4 shows a prior art example of a giant pulse.

FIG. 4 shows an example of a giant pulse 221 superimposed on a normal looking pulse 201 that occurred in the forward direction. A related pulse 222 measured by a back-reflection detector has a complex shape and has a magnitude several orders higher than the pulse 202 shown in FIG. 2. Indeed the optical powers 203 and 204 are not visible on this scale. The pulse 222 has a spike 223, a trailing edge 224, and a dip 225. These data were obtained by setting up the apparatus so that the backward spikes 213 and 214 were occurring at around 100 Hz. At this repetition frequency, the giant pulses 221 and associated pulses 222 were observed occurring at around one every five minutes. In other words, the giant pulses 221 are much more infrequent than the backward traveling pulses 213 and 214, and occur on a random basis.

It is believed that the dip 225 is again evidence of SBS. The backward traveling pulse 222 has sufficient energy to pump a forward going pulse via SBS. This results in the giant pulse 221 in the forward going direction which therefore extracts energy from the backward traveling pulse 222 resulting in the dip 225. All the above pulses are additionally amplified by the active gain medium in the amplifier 4.

Referring to FIG. 4, the amplitude 226 of the giant pulse 221 shown is approximately twice the amplitude 227 of the pulse 201 (without the giant pulse 221 superimposed). The amplitude 226 varies randomly, and can be several times the amplitude 227 of the pulse 201. It is believed that the amplitude of the giant pulse 221 can be sufficient to exceed the optical damage threshold of the fiber within the amplifier 4, and it is this, possibly with additional energy caused by the acoustic wave that is associated with SBS propagation, that caused the random and unpredictable catastrophic failures described above. However this explanation is just a theory and our attempt to describe a possible failure mechanism is not intended to limit the scope of the invention.

Referring again to FIG. 1, it is possible to control the first seed source 1, the second seed source 2, and the amplifier 4 such that the random optical pulses 213, 214 increase in frequency and amplitude when a peak power 10 of the second seeding radiation 12 is reduced.

Figure 5:
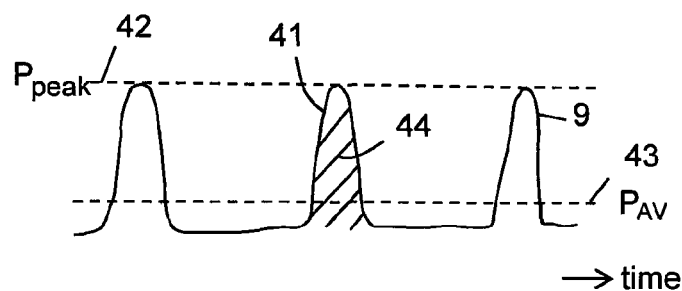
FIG. 5 shows pulses emitted from the apparatus of the invention.

It is possible to control the first seed source 1, the second seed source 2, and the amplifier 4 such that optical pulses 41, shown with reference to FIG. 5, emitted by the optical amplifier 4 have higher peak powers 42, higher average powers 43, and higher pulse energies 44 than for a similar apparatus that does not include the second seed source 2. In both cases, the limitation in the peak power achievable is the creation of random optical pulses and giant optical pulses that are believed to be induced by stimulated Brillouin scattering.

These results are surprising because apparatus with a first seed source 1 and no second seed source 2 (such as described in U.S. Pat No. 7,936,796) was believed to be operating with peak powers that could not be increased further owing to non-linear optical effects. Examples of non-linear effects that limit the achievable peak power, pulse energy, and average power, include spectral noise, temporal noise, speckle, non-linear wavelength conversion of the optical radiation, stimulated Brillouin scattering, stimulated Raman scattering, and self Q-switching. It is therefore surprising that peak power and/or pulse energy can be increased further by introducing the second seed source 2, combining the first seeding radiation 11 and the second seeding radiation 12 in the coupler 3, and amplifying the first seeding radiation 11 and the second seeding radiation 12 with the amplifier 4.

The first seeding radiation 11 may be characterized by a first wavelength 13. The second seeding radiation 12 may be characterized by a second wavelength 14. The first wavelength 13 may be the same as the second wavelength 14.

The coupler 3 is preferably a polarization combiner. The apparatus may be configured such that the first seeding radiation 11 and the second seeding radiation 12 are orthogonally polarized at respective inputs 15, 16 of the polarization combiner.

The apparatus may comprise a depolarizer 179 between the coupler 3 and the amplifier 4. The depolarizer 179 may be a Lyot depolarizer. The Lyot depolarizer may comprise two lengths of polarization maintaining optical fibre spliced together, with one length being twice the length of the other. When using a single seed source, it is found that a depolarizer scrambles the polarization of the seeding radiation prior to it entering into the amplifier 4, and thus enables the peak power of the optical radiation to be increased before non-linear effects such as stimulated Brillouin scattering become problematic.

The first seed source 1 may be a Fabry Perot semiconductor laser. The second seed source 2 may be a Fabry Perot semiconductor laser.

The first seed source 1 may be a superluminescent diode. The second seed source 2 may be a superluminescent diode.

The apparatus may comprise a first reflector 17 configured to reflect a proportion of the first seeding radiation 11 into the first seed source 1. The apparatus may comprise a second reflector 18 configured to reflect a proportion of the second seeding radiation 12 into the second seed source 2.

The first seed source 1 and the first reflector 17 may be separated by a first distance 6. The second seed source 2 and the second reflector 18 may be separated by a second distance 7. The first distance 6 may be the same as the second distance 7. This enables pulses from the first seed source 1 and the second seed source 2 to overlay if the first seed source 1 and the second seed source 2 are pulsed synchronously. Alternatively, the first distance 6 may be different from the second distance 7. This enables pulses from the first seed source 1 and the second seed source 2 to be dephased from each other, or interleaved with each other. Dephasing and interleaving the pulses can also be achieved by adjusting the first and second control signals 48 and 49 by the controller 5.

The first and the second reflectors 17, 18 may have the same spectral characteristics, or different spectral characteristics. Spectral characteristics include centre wavelength, bandwidth, reflectivity, and chirp.

The spectral characteristics of the first and the second reflectors 17, 18, and the first and the second distances 6, 7 may be selected to optimize a peak power and a pulse energy of the optical radiation. The peak power when both the first seed source 1 and the second seed source 2 are pulsed can be greater than the peak power when only one of the first seed source 1 and the second seed source 2 is pulsed, the limitation in the peak power being the random pulses 223, 244 and the giant pulse 221. The peak power can be at least two times greater, and preferably over five times greater.

The first reflector 17 and the second reflector 18 may be fibre optic Bragg gratings.

The controller 5 may be configured to emit a first control signal 48 to drive the first seed source 1, and a second control signal 49 to drive the second seed source 2. The first control signal 48 may be the same or different from the second control signal 49. Driving the first seed source 1 and the second seed source 2 with different control signals can help ensure that the gain dynamics with the first seed source 1 and the second seed source 2 are different from each other. This can be useful, for example, when pulsing a Fabry Perot semiconductor laser that has a plurality of longitudinal modes. The semiconductor laser can sometimes emit laser radiation in a single longitudinal mode during the pulse which can cause a stimulated Brillouin scattering event such as a random pulse or a giant pulse described with reference to FIGS. 2-5. Driving the semiconductor laser with different control signals can help reduce the likelihood that the first seed source 1 and the second seed source 2 emit in a single longitudinal mode at the same time during the pulse. The first drive signal 48 and the second drive signal 49 can be made different from each other with passive components, or by adjusting the circuit layout to ensure that capacitor or inductance is different for the two seed sources.

The apparatus may comprise a first optical isolator 8 located between the first seed source 1 and the amplifier 4 for isolating the first seed source 1 from backward traveling optical radiation 9 that propagates from the amplifier 4 towards the first seed source 1.

The apparatus may comprise a second optical isolator 52 located between the second seed source 2 and the amplifier 4 for isolating the second seed source 4 from backward traveling optical radiation 9 that propagates from the amplifier 4 towards the second seed source 2.

The apparatus may comprise a third optical isolator 53 located between the coupler 3 and the amplifier 4 for isolating both the first and second seed sources 1, 2 from backward traveling optical radiation 9.

The apparatus may include at least one preamplifier 21, and a fourth optical isolator 22. The fourth optical isolator 22 is located between the preamplifier 21 and the amplifier 4. The apparatus may comprise a visible laser diode 24 and a coupler 25, wherein the coupler 25 is configured to combine visible optical radiation 26 emitted from the visible laser diode 24 and optical radiation 27 emitted from the preamplifier 21, prior to amplification by the amplifier 4. The coupler 25 may be incorporated in the optical isolator 22. The coupler 25 is preferably a wavelength division multiplexer. The wavelength division multiplexer may be a fused fibre coupler.

The apparatus may further comprise a beam delivery cable 31 and an output optic 32, wherein the beam delivery cable 31 comprises an optical fibre 33 for transporting optical radiation emitted from the amplifier 4. The output optic 32 may comprise a fifth optical isolator 34.

The optical fibre 33 can be single mode or multimode. The optical fibre 33 can be a solid core fibre, a microstructured fibre, or a hollow core fibre. The hollow core fibre can be a Kagome fibre, a photonic crystal fibre, or an anti-resonant fibre. Such hollow core fibres are advantageous because they enable transmission of optical radiation over significantly longer distances without incurring non-linear optical effects. The optical fibre 33 can be a polarization maintaining fibre.

Figure 6:
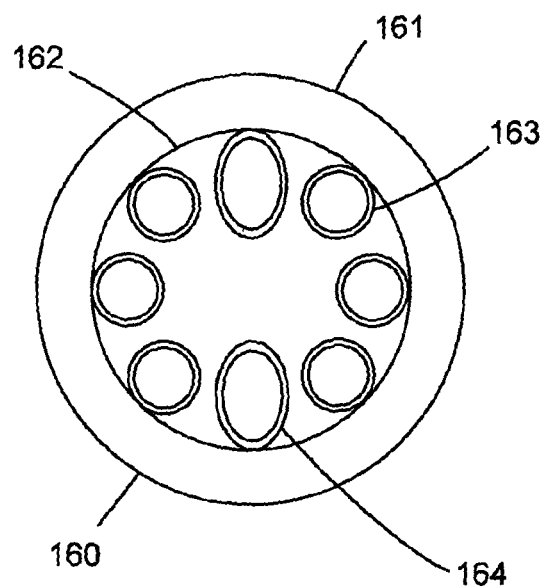
FIGS. 6 and 7 show cross sections of polarisation-maintaining hollow-core fibres.
Figure 7:
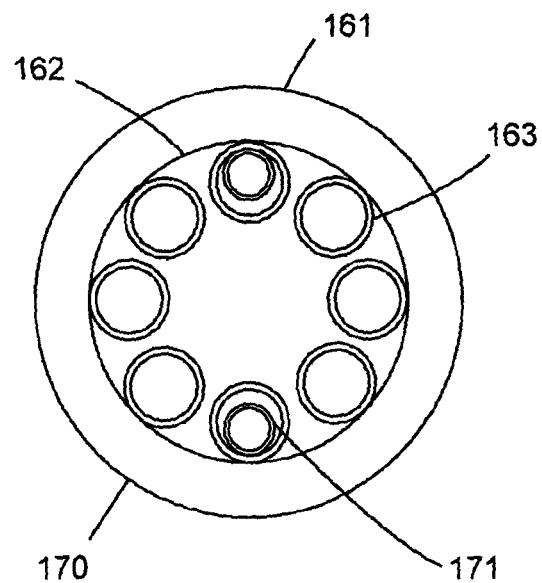

Examples of anti-resonant fibres are shown in FIGS. 6 and 7. The anti-resonant fibres 160 and 170 comprise a capillary 161, and a plurality of anti-resonant tubes 163 around an inner surface 162 of the capillary 161. Advantageously, the anti-resonant fibres 160 and 170 are polarisation maintaining fibres having anti-resonant tubes 163 arranged to provide a two-fold rotational symmetry component in the fibre's cross section. This can be achieved by incorporating first and second anti-resonant tubes 164 and 171 in which the first anti-resonant tubes 164 are larger and/or of a different shape than the second anti-resonant tubes 163 as shown in FIG. 16. Alternatively or additionally the first anti-resonant tubes may be nested tubes 171 as shown in FIG. 17. The nested tubes 171 can be made of an absorbing or scattering material in order to create losses of one polarisation compared to the other polarisation of light propagating along the fibre 170. Use of polarisation maintaining fibres can be advantageous in material processing applications such as marking, cutting and welding because material processing performance is often dependent upon the polarisation of the incident optical radiation. The ability to transmit polarised optical radiation to the work piece, and to adjust the polarisation by rotating the optical fibre and/or polarisation optics such as half waveplates, is highly advantageous in applications in which the material processing is dependent upon the polarisation of the optical radiation.

Figure 8:
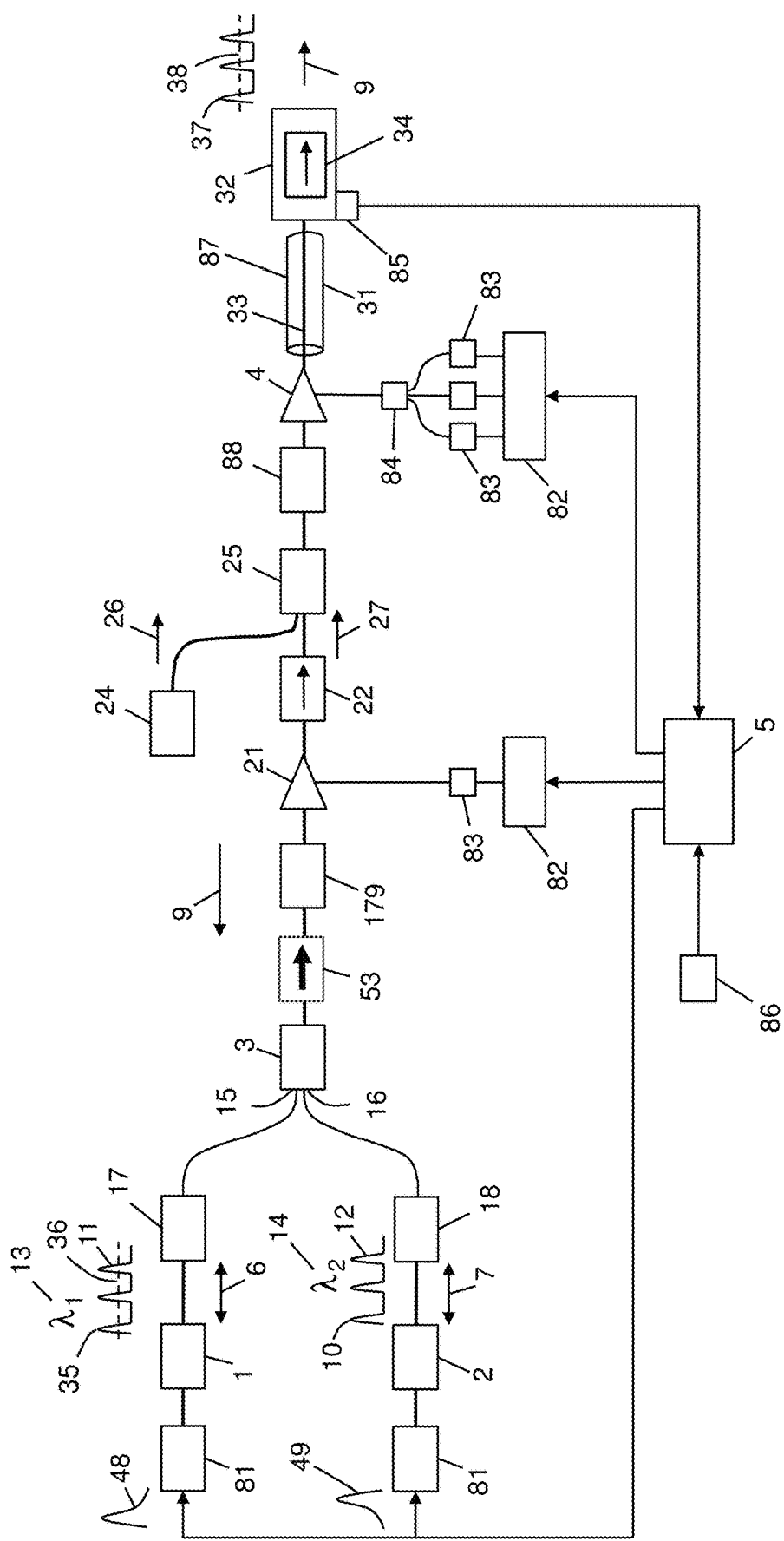
FIG. 8 shows apparatus for providing optical radiation according to the present invention comprising thermocouples for monitoring proper operation.

FIG. 8 shows an example of an apparatus for providing the optical radiation 9 in which the first and the second seed sources are semiconductor laser diodes. The controller 5 controls the first and the second seed sources 1, 2 via laser diode drivers 81. The laser diode drivers 81 are preferably high-speed laser diode drivers.

The pre-amplifier 21 is controlled via an electronic pump-diode driver 82 which controls the electronic current conducted by at least one pump diode 83. The pump diode 83 is preferably a multiple transverse mode semiconductor laser diode. The pump diode 83 may be an integral component of the pre-amplifier 21 and is not shown in FIG. 1.

The amplifier 4 is controlled via the electronic pump-diode driver 82 which controls the electronic current conducted by a plurality of pump diodes 83. The outputs of the pump diodes 83 are combined together by a pump combiner 84 which is preferably a multimode to multimode optical-fibre pump combiner. The pump diodes 83 are preferably multiple transverse mode semiconductor laser diode modules that comprise a plurality of multiple-transverse-mode semiconductor laser diodes. The pump diodes 83 and the pump combiner 84 may be integral components of the amplifier 4 and are not shown in FIG. 1.

The output optic 32 comprises a first temperature sensor 85 whose output is fed back to the controller 5. The temperature sensor 85 is used to ensure suitable optical isolation is provided by the fifth optical isolator 34. The temperature sensor 85 can be a thermocouple or a thermistor.

A second temperature sensor 86 is provided to monitor the temperature of a heat sink (not shown) to which the pump diodes 83 are attached. The output of the second temperature sensor 86 is connected to the controller 5. The controller 5 can use the known temperature power dependence of the pump diodes 83 to adjust the electric current flowing into the pump diodes 83 to ensure the output radiation 9 is stable over ambient temperature and time. Alternatively or additionally, the controller 5 can use measurement data obtained when calibrating the apparatus.

The beam delivery cable 31 is shown comprising a bend-restricting rugged hose 87 in order to ensure that the optical fibre 33 is not bent too tightly. If the bend radius of the optical fibre 31 is too tight, the optical radiation 9 can escape from the core of the optical fibre 31, which can lead to thermal damage of the optical fibre 31.

The optical fibre 31 can be a single mode optical fibre. Alternatively, the optical fibre 31 can be a multimode optical fibre in which case an optional mode adaptor 88 can be provided in order to ensure the optical modes that are guided by the optical fibre 31 are properly excited in order to give the desired optical power spatial distribution in the output radiation 9. For example, if the desired output radiation 9 were a top hat distribution, then it would be desirable for the optical modes guided by the optical fibre 31 to be equally excited. The mode adaptor 88 can be an optical fibre mode scrambler comprising at least one bend to scramble the optical modes guided by an internal optical fibre together.

Additional features which are not shown include a laser diode driver to control the visible laser diode 24, and fans for cooling the apparatus.

It is to be appreciated that the embodiments of the invention described above with reference to the accompanying drawings have been given by way of example only and that modifications and additional components may be provided to enhance performance. Individual components shown in the drawings are not limited to use in their drawings and they may be used in other drawings and in all aspects of the invention. The invention also extends to the individual components mentioned and/or shown above, taken singly or in any combination.

The invention claimed is:

1. Apparatus for providing optical radiation, which apparatus comprises:
a first seed source for providing first seeding radiation comprising pulses;
a second seed source for providing second seeding radiation comprising pulses;
the first seed source is a Fabry Perot semiconductor laser, and the second seed source is a Fabry Perot semiconductor laser;
a coupler connected to the first seed source and the second seed source for coupling the first seeding radiation and the second seeding radiation together;
at least one amplifier for amplifying the first seeding radiation and the second seeding radiation;
a controller for controlling the first seed source, the second seed source, and the amplifier;
the controller controls the first seed source and the second seed source via laser diode drivers such that pulses from the first seed source and the second seed source overlay each other;
the first seeding radiation is characterized by a first wavelength, the second seeding radiation is characterized by a second wavelength, and the first wavelength is the same as the second wavelength;
the controller controls the first seed source, the second seed source and the amplifier to amplify the first seeding radiation and the second seeding radiation with the amplifier such that the pulses have higher peak powers, higher average powers, and higher pulse energies than for a similar apparatus that does not include the second seed source, the apparatus being such that it is possible to control the first seed source the second seed source, and the amplifier such that random spikes superimposed on backward travelling pulses that propagate in an opposite direction to the optical pulses increase in frequency and amplitude when a peak power of the second seeding radiation is reduced; and
such that a peak power of the first seeding radiation is greater than a threshold peak power that results in stimulated Brillouin scattering of sufficient intensity to damage the apparatus when there is no second seeding radiation emitted by the second seed source and to prevent a peak power of the second seeding radiation reducing to a level at which the apparatus exceeds a damage threshold of the apparatus, whereby the apparatus is operable to provide the optical radiation with a peak power that is greater than when there is no second seed source.

2. Apparatus according to claim 1 wherein the coupler is a polarization combiner, and the apparatus is configured such that the first seeding radiation and the second seeding radiation are orthogonally polarized.

3. Apparatus according to claim 1 wherein the apparatus comprises a depolarizer located between the coupler and the amplifier.

4. Apparatus according to claim 1 wherein the apparatus comprises a first reflector configured to reflect a proportion of the first seeding radiation into the first seed source.

5. Apparatus according to claim 4 wherein the apparatus comprises a second reflector configured to reflect a proportion of the second seeding radiation into the second seed source, the first seed source and the first reflector are separated by a first distance, the second seed source and the second reflector are separated by a second distance, and the first distance is equal to the second distance.

6. Apparatus according to claim 4 wherein the apparatus comprises a second reflector configured to reflect a proportion of the second seeding radiation into the second seed source, the first seed source and the first reflector are separated by a first distance, and the second seed source and the second reflector are separated by a second distance, and the first distance is different from the second distance.

7. Apparatus according to claim 1 wherein the controller is configured to emit a first control signal to drive the first seed source, and a second control signal to drive the second seed source, and wherein the first control signal is different from the second control signal.

8. Apparatus according to claim 1 and including at least one preamplifier, an optical isolator, a visible laser diode and a coupler, wherein the optical isolator is located between the preamplifier and the amplifier, and the coupler is configured to combine optical radiation emitted from the visible laser diode and the preamplifier, and to pass the combined optical radiation to the amplifier.

9. Apparatus according to claim 1, wherein the apparatus comprises a beam delivery cable and an output optic, and wherein the beam delivery cable comprises an optical fibre for transporting the optical radiation emitted from the amplifier and wherein the optical fibre is a hollow core fibre.

10. A method for providing optical radiation, which method comprises:
    providing first seeding radiation comprising pulses from a first seed source;
    providing second seeding radiation comprising pulses from a second seed source;
    Whereby the first seed source is a Fabry Perot semiconductor laser, and the second seed source is a Fabry Perot semiconductor laser;
    coupling the first seeding radiation and the second seeding radiation together with a coupler;
    amplifying the first seeding radiation and the second seeding radiation with at least one amplifier;
    providing a controller for controlling the first seed source, the second seed, and the amplifier;
    Wherein the controller controls the first seed source and the second seed source via laser diode drivers such that pulses from the first seed source and the second seed source overlay each other;
    wherein the first seeding radiation is characterized by a first wavelength, the second seeding radiation is characterized by a second wavelength, and the first wavelength is the same as the second wavelength; and
    whereby the pulses have higher peak powers, higher average powers, and higher pulse energies than for a similar apparatus that does not include the second seed source, such that it is possible to control the first seed source, the second seed source, and the amplifier such that random spikes superimposed on backward travelling pulses that propagate in an opposite direction to the optical pulses increase in frequency and amplitude when a peak power of the second seeding radiation is reduced;
    the method comprising using the controller to control the first seed source, the second seed source and the amplifier to amplify the first seeding radiation and the second seeding radiation with the amplifier and to prevent a peak power of the second seeding radiation reducing to a level at which the apparatus exceeds a damage threshold of the apparatus, whereby the apparatus is operable to provide the optical radiation with a peak power that is greater than when there is no second seed source.

11. A method according to claim 10, wherein the coupler is a polarization combiner, and the first seeding radiation and the second seeding radiation are orthogonally polarized.

12. A method according to claim 11 including the step of providing a depolarizer between the coupler and the amplifier.

13. A method according to claim 10, and including the step of providing a first reflector to reflect a proportion of the first seeding radiation into the first seed source.

14. A method according to claim 13 and including the step of providing a second reflector to reflect a proportion of the second seeding radiation into the second seed source, wherein the first seed source and the first reflector are separated by a first distance, and the second seed source and the second reflector are separated by a second distance, and the first distance is different from the second distance.

15. A method according to claim 10, and including the steps of using the controller to emit a first control signal to drive the first seed source, and a second control signal to drive the second seed source, and wherein the first control signal is different from the second control signal.

16. A method according to claim 10, and including the step of providing a beam delivery cable and an output optic, and wherein the beam delivery cable comprises an optical fibre for transporting the optical radiation emitted from the amplifier, and the optical fibre is a hollow core fibre.

* * * * *